United States Patent [19]

Handwerker

[11] Patent Number: 5,780,367
[45] Date of Patent: Jul. 14, 1998

[54] REFLECTIVE SUMMER CURE BLANKET FOR CONCRETE

[76] Inventor: Gary Handwerker, 2311 Burr Oak Rd., Northfield, Ill. 60093

[21] Appl. No.: 784,913

[22] Filed: Jan. 16, 1997

[51] Int. Cl.$^6$ .................................................. B32B 3/00
[52] U.S. Cl. ........................ 442/235; 442/228; 442/238
[58] Field of Search ........................ 428/75; 442/228, 442/238, 235

[56] References Cited

U.S. PATENT DOCUMENTS

| | | | |
|---|---|---|---|
| 3,420,022 | 1/1969 | Brock | 52/302 |
| 3,659,077 | 4/1972 | Olson | 219/213 |
| 4,485,137 | 11/1984 | White | 428/57 |

*Primary Examiner*—Alexander Thomas
*Attorney, Agent, or Firm*—Sonnenschein Nath & Rosenthal

[57] ABSTRACT

An improved flexible lightweight reflective summer cure blanket for curing concrete and like materials in geographic areas that experience significant daylight conditions. During the concrete wet curing process, the blanket acts to facilitate the retention of water uniformly in the curing concrete. The blanket has a moisture-impervious exterior surface layer of a single-ply low density thermoplastic translucent film. Immediately beneath the surface layer is an aluminum colored (or coated) woven polyethylene fabric which is further configured with an opaque lower surface. The metallic surface of this fabric acts to reflect heat radiating from the curing concrete back toward the concrete, while also reflecting sunlight. The blanket also has an exterior batting layer of a porous, resilient, polymeric non-woven fabric with hydrophobic properties and sufficient filament length to promote wicking (or capillary wetting action) properties. The reflective summer cure blanket is flexible and lightweight, can be combined with similar adjacent blankets to cover large areas of curing concrete, maintains uniform wetness against the concrete with good wicking (or capillary wetting action) properties, easily conforms to irregular surfaces, and reflects both sunlight and heat radiating from the curing concrete thereby effectively retarding the evaporation of moisture from the concrete. A related method is also disclosed for retarding moisture evaporation from curing concrete using a curing blanket that has a heat reflective surface.

27 Claims, 1 Drawing Sheet

5,780,367

REFLECTIVE SUMMER CURE BLANKET FOR CONCRETE

BACKGROUND OF THE INVENTION

This invention is directed to a reflective summer cure blanket, and more particularly, to a flexible lightweight reflective summer cure blanket used for curing concrete and like materials in geographic areas that experience significant sunlight conditions. The blanket has a moisture-impervious surface layer, an opaque heat-reflective interior fabric layer, and a porous synthetic batting layer.

One of the critical requirements in producing quality concrete is the necessity of a mandatory curing process. During this concrete curing process, chemical changes to the concrete occur in the presence of water that relate to setting and hardening which ensure that the hardened concrete will be water-tight and durable. These chemical changes continue to occur over a considerable period of time, requiring that the curing concrete be kept wet during the curing period. For example, if concrete is kept wet for the first ten days after setting, its resulting strength and durability increase 75 percent over ordinary aging of the concrete at dry surface conditions. Horizontal surfaces of concrete are often covered by sand, canvas, or burlap to maintain the desired dampness during the curing period; irregular concrete surfaces cannot be covered and are often kept damp by frequent periodic sprinklings. The heat radiating from the concrete during the curing process tends over time to evaporate the moisture in the concrete, inhibiting the chemical hardening process and compromising the strength and durability of the cured concrete. Thus, it is necessary to contain the radiating heat and moisture in the damp concrete long enough to permit the curing process to be uniformly and sufficiently completed.

One prior art approach to solve this problem is a type of concrete curing blanket that is formed of coarse, woven, burlap fibers which are carried on a thermoplastic sheet that is heat sealed or otherwise melted onto the burlap fabric. While the natural burlap fiber has hydrophilic characteristics, which tends to promote wicking or capillary wetting action of water across the blanket to extend the duration of the dampness present in the curing concrete, for many different reasons this blanket is a less than effective solution. Such reasons include the inability of the blanket to evenly conform to irregular surfaces, the potential for the blanket to tear during use, the existence of large void areas in the burlap weave which promote non-uniform wetting of the concrete, the deterioration of the blanket over time, and bacterial decomposition of the burlap if stored in a damp condition. Further, the burlap once wet tends to discolor the concrete when drying. Another disadvantage is that the heat radiating from the curing concrete is not reflected by this blanket, resulting in the continuous and significant evaporation of moisture from the concrete in a manner that is not retarded by this blanket during extended daylight hours. This exacerbates the technical problem being addressed with respect to the critical variable of the retention of moisture required for the proper curing of concrete for as long as possible in the concrete. Should the evaporation of the moisture be too great, periodic rewetting of the curing concrete may be required.

A different approach to solve this problem is taught by U.S. Pat. No. 4,485,137 to White titled "Concrete Curing Blanket" which is directed to a lightweight concrete curing blanket that has high water retention irrespective of the surface irregularities present in the concrete, that provides for effective water wicking or capillary wetting action characteristics across the entire blanket, and that can be easily sealed with an adjacent blanket to provide continuous coverage of a large area of curing concrete. This blanket has a nonporous surface layer (e.g., approximately three mils), which may be opaque, of a low density polyethylene. The surface layer is heat sealed as a coating upon a batting layer (e.g., approximately one-tenth inch) of a porous, resilient, non-woven, needle-punched, synthetic fabric like polypropylene or other commercially available polymeric filament fabric. The opaque surface layer of this blanket reflects visible sunlight and UV radiation, although not completely, depending on the total effectiveness of the opaque layer. Thus, the concrete only retains moisture to a limited extent. Although this blanket reduces the rate of evaporation of moisture from the curing concrete, this blanket cannot reflect the radiating heat originating from the curing concrete. Hence, the evaporation of moisture from the curing concrete remains a problem that has to be periodically monitored, with rewetting of the curing concrete.

The present invention overcomes these and other problems that are inherent in existing summer cure blankets for concrete and like materials.

SUMMARY OF THE INVENTION

The principal object of the present invention is to provide a flexible, lightweight, summer cure blanket having an opaque moisture-impervious exterior surface with a heat reflective interior surface, and a batting layer of porous, resilient, non-woven, synthetic fabric with hydrophobic properties and sufficient filament length to promote water wicking or capillary wetting action properties.

Another object of the invention is to provide a flexible, lightweight, summer cure blanket having an opaque moisture-impervious exterior surface of low density polyethylene with a heat reflective interior surface, and a batting layer of porous, resilient, non-woven, polypropylene fabric with hydrophobic properties and sufficient filament length to promote water wicking or capillary wetting action properties.

A further object of the invention is to provide a flexible, lightweight, summer cure blanket having an opaque moisture-impervious exterior surface with a heat reflective interior surface, and a batting layer of porous, resilient, non-woven, synthetic fabric with hydrophobic properties and sufficient filament length to promote water wicking or capillary wetting action properties without materially increasing the weight or thickness of the blanket.

A further object of the invention is to provide a flexible, lightweight, summer cure blanket having a opaque moisture-impervious exterior surface of low density polyethylene with a heat reflective interior surface, and a batting layer of porous, resilient, non-woven, polypropylene fabric with hydrophobic properties and sufficient filament length to promote water wicking properties without materially increasing the weight or thickness of the blanket.

In accordance with this invention, there is provided a lightweight reflective concrete blanket for curing concrete and like materials, the blanket comprising: a film-like moisture-impervious first layer; an opaque moisture-impervious heat reflective second layer, the second layer having an opaque first surface and a heat reflective surface opposite thereof, the heat reflective surface deposed adjacent to the first layer, the second layer adapted to reflect heat radiating from the surface of the curing concrete, the second layer having a predetermined thickness; and a porous batting layer having hydrophobic properties, the batting layer having an upper portion, the second layer disposed adjacent the upper portion of the batting layer, the first layer, second layer and batting layer operatively sealed so the blanket is impervious to moisture, whereby, the blanket retards the moisture evaporation from the wet curing concrete by reflecting heat radiating from the curing concrete. The reflective summer cure blanket is flexible and lightweight, can be combined with similar adjacent blankets to cover large areas of curing concrete, maintains uniform wetness against the concrete with good wicking or capillary wetting action properties, easily conforms to irregular surfaces, and reflects both sunlight and heat radiating from the curing concrete thereby effectively retarding the evaporation of moisture from the concrete.

These and other objects and advantages of the present invention will be clarified in the following description of the preferred embodiment in connection with the drawings, the disclosure and the appended claims, wherein like reference numerals represent like elements throughout.

DESCRIPTION OF THE PREFERRED EMBODIMENT

Figure 1:
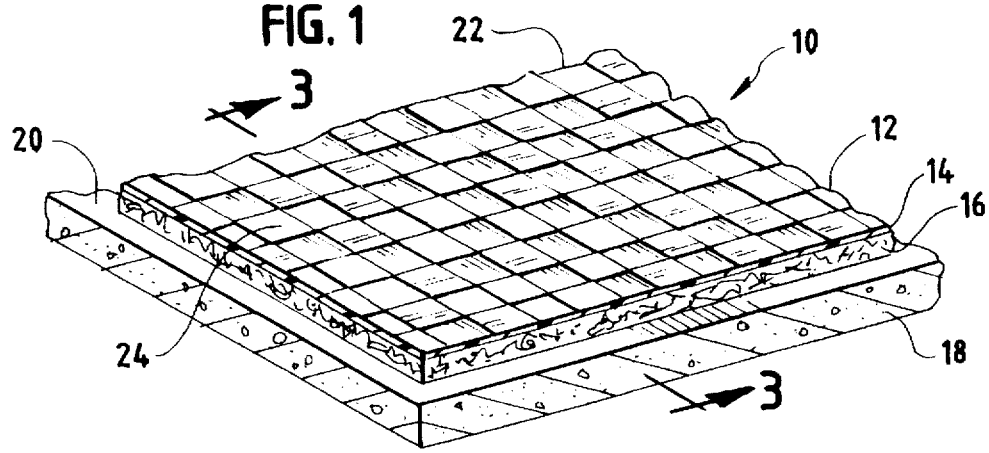
FIG. 1 is a perspective view of the reflective summer cure blanket of the present invention.

FIG. 1 is a perspective view of a reflective summer cure blanket 10 constructed in accordance with the present invention. In FIG. 1, this embodiment of the blanket 10, while it may have any shape and size, is usually rectangular with a width of approximately 6 feet and a length of several tens of feet. The blanket 10 is easily rolled-up for transport to different job sites and storage by the user. The blanket 10 is easy to clean and is relatively maintenance free. The blanket 10 is lightweight (e.g., about six ounces per square yard), pliable, durable, and long-lasting. Under expected conditions, the blanket is reusable for many years.

The blanket 10 is formed of a moisture-impervious top surface layer 12, a woven polyethylene fabric layer 14, and a lower batting layer 16. To produce unitary and uniform composite covering for curing concrete the blanket 10 is manufactured using conventional thermoplastic hot extrusion manufacturing practices for polyethylene films and/or fabrics that are common and well understood by those in the thermoplastic industry. The layers 12, 14, and 16 are integrally secured together by a conventional in-line hot melt extrusion coating process or a suitable heat gluing adhesion process. The surface layer 12 is secured to the top surface of the fabric layer 14, which in like fashion is secured to the top surface of the batting layer 16, providing a permanent attachment between each layer 12, 14, and 16. In the preferred embodiment, the blanket 10 will not adhere to the curing concrete 18 or leave any marks or impressions in the surface 20 of the curing concrete 18.

The peripheral edges 22 of the blanket 10 may be securely fastened or otherwise effectively sealed, and provided with a grommet and rope attachment (not shown) for use on vertical, sloping, or highly irregular concrete surfaces. When the blanket 10 is properly used, the underside of the batting layer 16 will be in continuous contact with the surface 20 of the wet curing concrete 18.

In the preferred embodiment for the blanket 10, the surface layer 12 is a translucent single-ply moisture-impervious low density thermoplastic material (e.g., polyethylene and like polymer compound materials) in the nature of a thin film (e.g., approximately 1 mil thickness). Alternatively, the surface layer 12 may be transparent (or clear) rather than translucent.

As depicted in FIG. 1, the surface layer 12 may have a weave-like pattern 24 present, another suitable pattern or texture present, or may be free of any patterns or texture. The weave-like pattern 24 is a consequence of the selection of the particular type of woven polyethylene fabric that is used for the fabric layer 14 positioned immediately below the surface layer 12.

The fabric layer 14 selected for manufacturing the blanket 10 of the preferred embodiment has a top reflective surface 15 (which is aluminum coated or sufficiently colored) and a lower opaque moisture-impervious surface 30. The thickness of the layer 14 is approximately 3–4 mils.

In this context, a "woven" polyethylene fabric is understood to mean that each strand of polyethylene fabric (e.g., approximately ⅛ inch wide) interlaces the next strand of polyethylene fabric (e.g., approximately ⅛ inch wide). The specific woven polyethylene fabric used for layer 14 is high tensile HDPE fabric and is commercially available under the following technical data specification, namely, under the registered trademark LORETEX, manufactured by Loretex Corporation of Guilderland Center, N.Y. 12085. This woven polyethylene fabric is commonly referred to as 5×4 (e.g., 5 strands in the horizontal direction and 4 strands in the vertical direction). The woven polyethylene fabric is available in varying standard colors, as well as with varying weave patterns (e.g., 5×8, 7×10, 10×10, 12×12). An attribute to the present blanket is that in its construction the blanket will avoid stretching which would otherwise cause openings through which moisture could escape.

The batting layer 16 is a porous and resilient felt pad, polymeric filament, fibrous pad, or like materials (such as polypropylene), which will yieldably conform to the surface 20 of the curing concrete 18 covered by the blanket 10. The batting layer 16 is hydrophobic and inert so as not to suffer degradations over time under varying external conditions. The batting layer 16 will be in contact with the surface 20 of the wet curing concrete 18 and accordingly has good wicking properties (e.g., capillary wetting action) to enable water wetting the concrete surface to be uniformly maintained across the surface of the curing concrete by the wicking of excess water to drier areas through the batting layer 16. The wicking action from the batting layer 16 will facilitate the transfer of any excess water from any excess wet areas present by redistributing the water to any dry areas of the wet curing concrete. Good results have been obtained where the batting layer 16 is a relatively thick, non-woven, fibrous, soft pad to promote its water wicking properties. Preferably, this type of fabric has a relaxed state thickness of approximately one-tenth inch with a hairiness well suited for adhesion of the hot melt coating application in conjunction with the fabric layer 14. Generally, the type of polymeric fabric selected will have a weight of about four ounces per square yard. Typically, as a result of the wicking action, the blanket 10 will hold about 50 percent more water than a conventional blanket made of burlap fabric.

To get a good overall adhesion between the layers 12, 14, and 16 of the blanket 10, the lower opaque surface 30 of the fabric layer 14 is applied onto the batting layer 16 by a conventional hot melt extrusion process, and the surface layer 12 is simultaneously applied to the top reflective surface 15 of the fabric layer 14. The temperature and application rate is controlled so that the fabric layer 14 penetrates about one-fourth into the batting layer 16.

Figure 2:
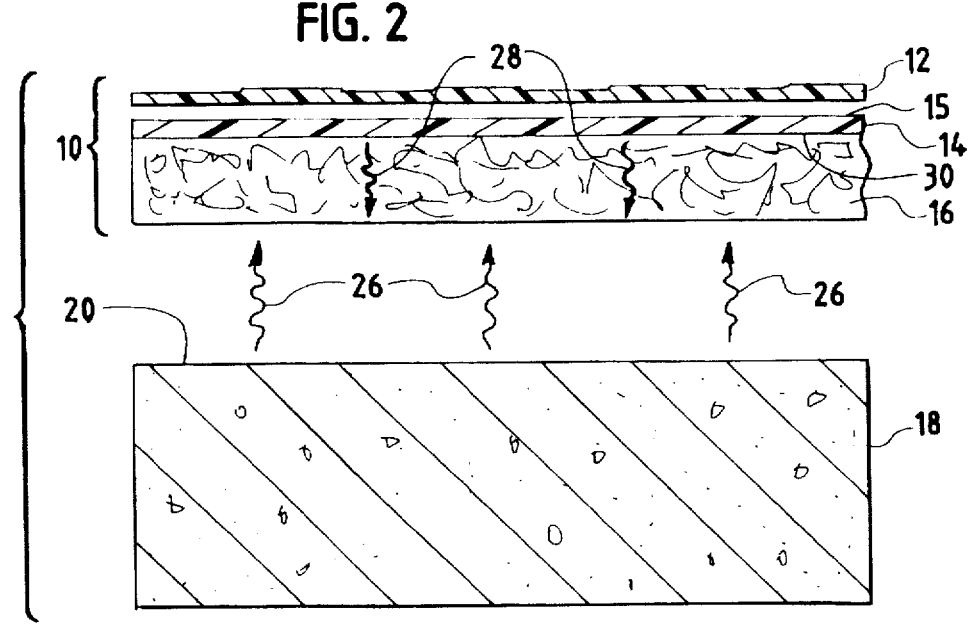
FIG. 2 is an expanded cross-sectional view taken through 2—2 of FIG. 1 of the reflective summer cure blanket of the present invention resting upon concrete ongoing wet curing.

FIG. 2 is an expanded cross-sectional view taken through 2—2 of FIG. 1 of the reflective summer cure blanket 10 resting upon concrete 18 undergoing wet curing. In FIG. 2, the heat radiating from the concrete 18 during the curing process is depicted by escaping arrows 26. Accordingly, the escaping heat arrows 26 pass through the batting layer 16 of the blanket 10 and are then reflected off the lower opaque surface 30 of the fabric layer 14 and the top reflective surface 15 of the fabric layer 14, as depicted by heat reflective arrows 28, back through the batting layer 16 toward the curing concrete 18. This heat reflective process assists in containing the escaping radiating heat 26 within the concrete 18 and retards the rate of moisture evaporation from the curing concrete, thereby ensuring that the cured concrete will be sufficiently durable and water-tight.

Figure 3:
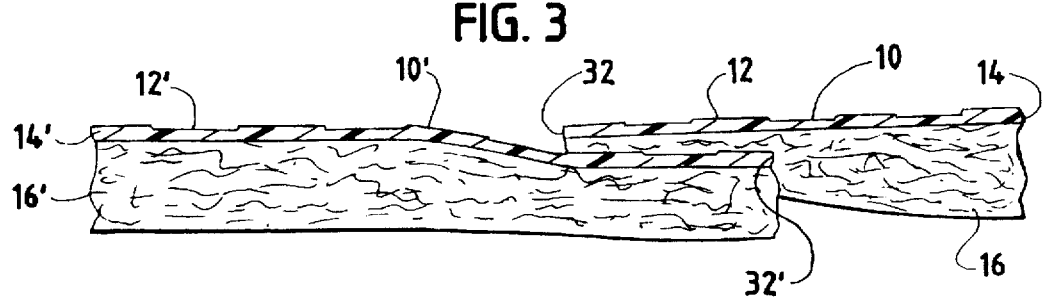
FIG. 3 is an enlarged section view taken transversely through two of the blankets depicted in FIG. 1, with the blankets of the present invention heat sealed together.

FIG. 3 is an enlarged section view taken transversely through two of the blankets 10 depicted in FIG. 1 which are constructed in accordance with the present invention, with the blankets 10 and 10' heat sealed together at the job site location. In FIG. 3, the blanket 10 of the present invention can be joined to an adjacent blanket 10' by overlapping the leading edges 32 a few inches and then heat sealing the edges 32 by use of a conventional heat sealing apparatus. Sufficient heating and external pressure is applied to the exterior area of the blankets being heat sealed to create a mechanical and water tight joint. In a similar fashion, the blankets 10 and 10' may be joined to other adjacent blankets to effectively cover larger areas of curing concrete.

Although the foregoing detailed description of the present invention has been described by reference to a single embodiment, and the best mode contemplated for carrying out the present invention has been herein shown and described, it will be understood that modifications or variations in the structure and arrangement of that embodiment other than those specifically set forth herein may be achieved by those skilled in the art and that such modifications are to be considered as being within the overall scope of the present invention. Therefore, the description covers not only the present invention, but any and all modifications, variations, or equivalents that fall within the true spirit and scope of the underlying principles disclosed and claimed herein. Consequently, the scope of the present invention is intended to be limited only by the attached claims.

I claim:

1. A lightweight reflective concrete blanket for overlaying wet curing concrete and like materials, the blanket comprising:

a film-like moisture-impervious first layer;

an opaque heat reflective woven fabric layer, the woven fabric layer having a lower opaque surface and a top reflective surface opposite thereof, the top reflective surface disposed adjacent to the first layer, the woven fabric layer adapted to reflect heat radiating from the surface of the curing concrete;

a porous batting layer, the batting layer having an upper portion, the lower opaque surface of the woven fabric layer disposed adjacent to the upper portion of the batting layer, the first layer, woven fabric layer, and batting layer operatively sealed so the blanket is impervious to moisture.

2. The blanket according to claim 1, wherein the first layer is comprised of a polyethylene film.

3. The blanket according to claim 1, wherein the thickness of the first layer is substantially 1 mil.

4. The blanket according to claim 1, wherein the woven fabric layer is comprised of polyethylene.

5. The blanket according to claim 1, wherein the top reflective surface of the woven fabric layer is comprised of aluminum.

6. The blanket according to claim 1 wherein the batting layer comprises a nonwoven resilient polymeric fabric.

7. The blanket according to claim 1 wherein the batting layer has a predetermined thickness.

8. The blanket according to claim 1, wherein the thickness of the woven fabric layer is substantially 3 mils.

9. The blanket according to claim 1, wherein the batting layer is comprised of polypropylene.

10. The blanket according to claim 1, wherein the thickness of the batting layer is substantially one-tenth inch.

11. The blanket according to claim 1 wherein the film-like moisture-impervious first layer is translucent.

12. The blanket according to claim 1 wherein the woven fabric layer is moisture-impervious.

13. The blanket according to claim 1 wherein the batting layer has hydrophobic properties.

14. The blanket according to claim 1 wherein the woven fabric layer has a predetermined thickness.

15. A lightweight reflective concrete blanket for overlaying wet curing concrete and like materials, the blanket comprising:

a film-like moisture-impervious first layer;

an opaque heat reflective polyethylene fabric layer, the polyethylene fabric layer having a lower opaque surface and a top reflective surface opposite thereof, the top reflective surface disposed adjacent to the first layer, the polyethylene fabric layer adapted to reflect heat radiating from the surface of the curing concrete;

a porous batting layer, the batting layer having an upper portion, the polyethylene fabric layer disposed adjacent to the upper portion of the batting layer, the first layer, polyethylene fabric layer, and batting layer operatively sealed so the blanket is impervious to moisture.

16. The blanket according to claim 15, wherein the first layer is comprised of a polyethylene film.

17. The blanket according to claim 15, wherein the thickness of the first layer is substantially 1 mil.

18. The blanket according to claim 15, wherein the top reflective surface of the polyethylene fabric layer is comprised of aluminum.

19. The blanket according to claim 15 wherein the batting layer comprises a non-woven resilient polymeric fabric.

20. The blanket according to claim 15 wherein the batting layer has a predetermined thickness.

21. The blanket according to claim 15, wherein the thickness of the polyethylene fabric layer is substantially 3 mils.

22. The blanket according to claim 15, wherein the batting layer is comprised of polypropylene.

23. The blanket according to claim 15, wherein the thickness of the batting layer is substantially one-tenth inch.

24. The blanket according to claim 15, wherein the film-like moisture-impervious first layer is translucent.

25. The blanket according to claim 15 wherein the polyethylene fabric layer is moisture-impervious.

26. The blanket according to claim 15 wherein the batting layer has hydrophobic properties.

27. The blanket according to claim 15 wherein the polyethylene fabric layer has a predetermined thickness.

* * * * *